June 13, 1967          O. A. BENDLER          3,324,682
BALL TYPE CONSTANT VELOCITY UNIVERSAL JOINT
Filed Sept. 24, 1965          3 Sheets-Sheet 1
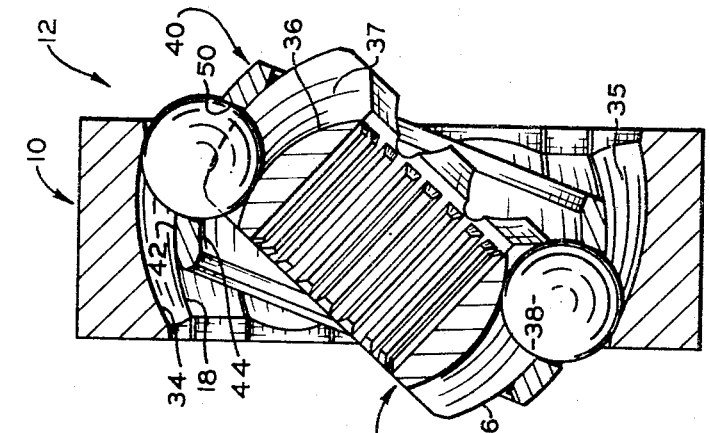
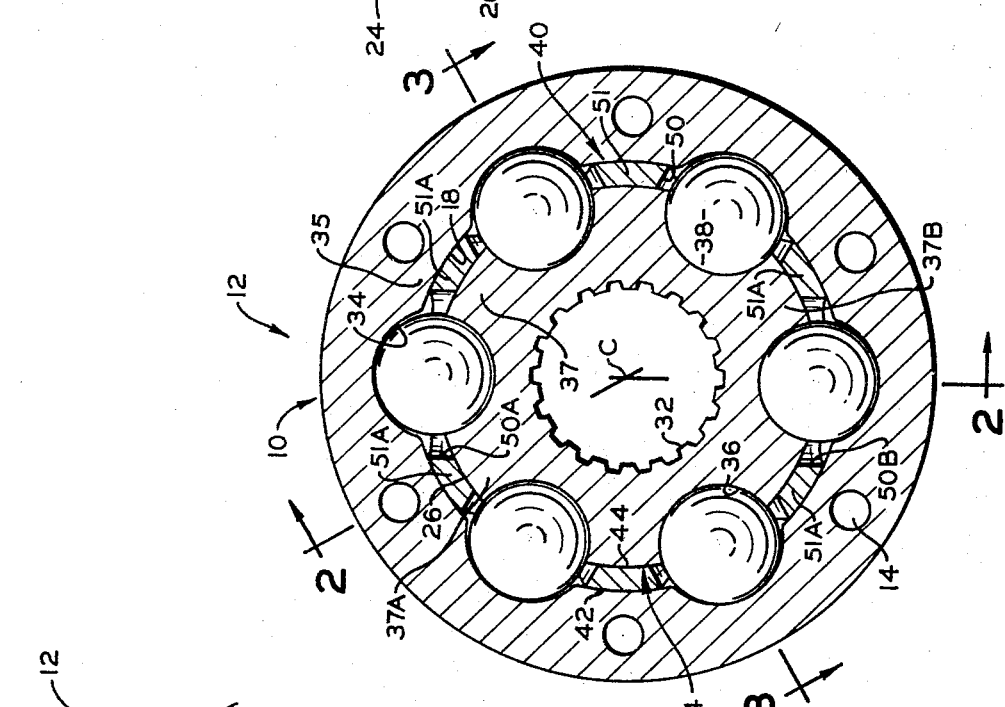
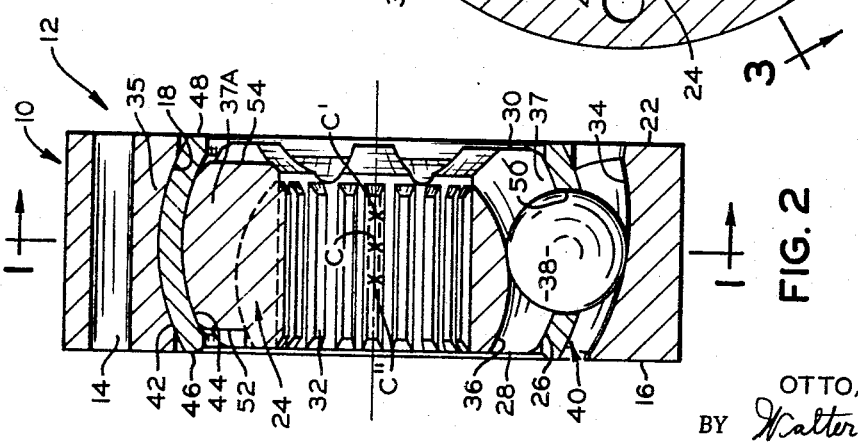
*INVENTOR.*
OTTO A. BENDLER
BY Walter E. Pavlick
Harold D. Shall
ATTORNEYS June 13, 1967 O. A. BENDLER 3,324,682
BALL TYPE CONSTANT VELOCITY UNIVERSAL JOINT
Filed Sept. 24, 1965 3 Sheets-Sheet 2
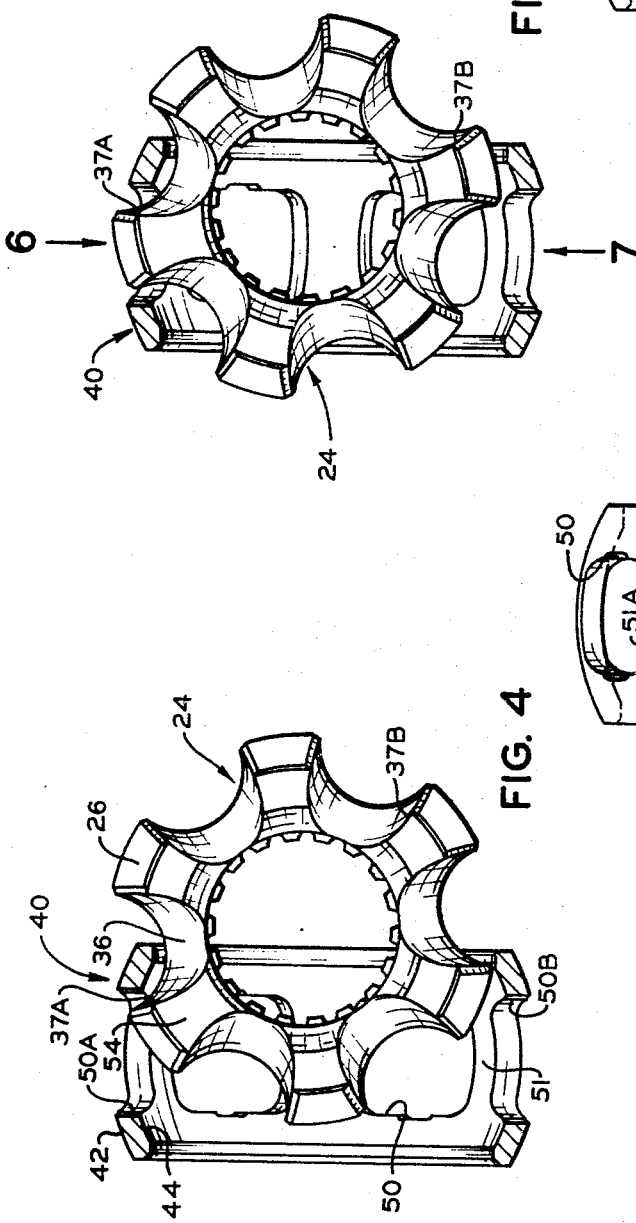
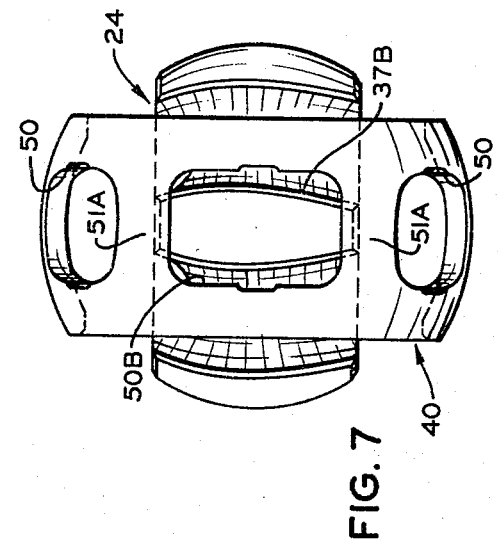
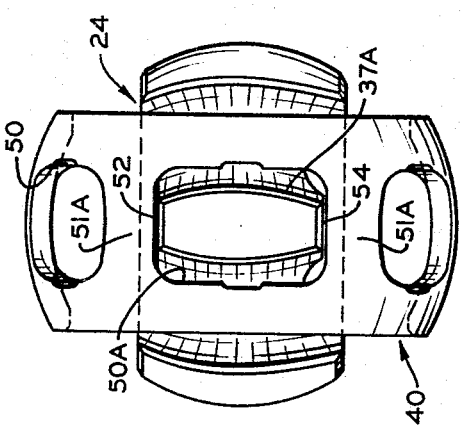
INVENTOR.
OTTO A. BENDLER
BY Walter E. Pavlick
Harold D. Shall
ATTORNEYS June 13, 1967  O. A. BENDLER  3,324,682
BALL TYPE CONSTANT VELOCITY UNIVERSAL JOINT
Filed Sept. 24, 1965  3 Sheets-Sheet 3

INVENTOR.
OTTO A. BENDLER
BY Walter E. Pavlick
Harold D. Shall
ATTORNEYS

United States Patent Office 3,324,682
Patented June 13, 1967

3,324,682
BALL TYPE CONSTANT VELOCITY
UNIVERSAL JOINT
Otto A. Bendler, Detroit, Mich., assignor to Dana Corporation, Toledo, Ohio, a corporation of Virginia
Filed Sept. 24, 1965, Ser. No. 489,955
13 Claims. (Cl. 64—21)

This invention relates in general to constant velocity universal joints of the ball type and more particularly to an improved construction therefor.

Ball type constant velocity universal joints are well known in the prior art and have been used extensively in applications where it is desired to transmit torque at a uniform angular velocity between a pair of members. One general class of ball type universal joints comprises inner and outer torque transmitting members, a plurality of drive balls for transmitting torque between the members and an intermediate cage. The outer member has a generally truncated spherical bore and receives therein, in a radially spaced relationship, the inner member, the latter having a generally truncated spherical periphery, and the cage is generaly annular in form with spherical inner and outer surfaces which slidingly contact the periphery of the inner member and the bore of the outer member respectively so that these members may be angularly displaced relative to each other. A plurality of pairs of generally axially extending grooves are provided, one groove of each pair being formed in the periphery of the inner member and the other groove of each pair being formed in the outer member within the bore thereof, and each pair of grooves receive a drive ball in a torque transferring relationship; the drive balls being received in apertures formed in the cage. The assembly of these the outer and inner members and the cage, as heretofore practiced and as shown in United States Patent 1,916,442, made modification of the cage structure necessary; particularly since these elements have spherical portions in contact with one another. The subassembly of the inner spherical member within the cage required that at least one drive ball receiving aperture in the cage be elongated to permit insertion of a portion of the spherical inner member during the assembly process. To place the inner member and cage subassembly within the outer member meant that a pair of opposed apertures in the cage be elongated. The elongation of two opposed apertures greatly reduces the cross-sectional area of the web portions adjacent these apertures and thus severely weakens the cage structure.

In order to produce the uniform angular velocity characteristic the drive balls should be maintained at all times in substantially a common plane, which plane bisects the angle included between the axes of the inner and outer members. A function of the cage is to maintain the drive balls in this common plane. In some constant velocity universal joints of this class the intersecting relationship of the grooves positions this common plane in the bisecting plane, while in others, pilot means such as seen in United Statts Patents 2,010,899 and 2,352,776, are utilized to position the cage in the bisecting plane so that the cage not only maintains the balls in a common plane but also positions the plane.

The normal relationship of the drive balls and grooves containing the same is such that, when the grooves are in an intersecting relationship, there is a marked tendency for the grooves to cam the balls in an axial direction, thus placing a heavy thrust load on the cage and between the engaging spherical surfaces of the cage and the inner and outer members. In addition to this camming action, centrifugal forces set up by rotation of the universal joint act on the drive balls and place an additional thrust load on the cage. The effect of these centrifugal forces causes the drive balls to move radially outwardly and thence along the grooves into engagement with the cage whereby the drive balls impose an axial load on the cage member. Since a component of this loading acts in an axial direction as does the prior loading, it adds to that prior axial thrust load.

These axial loads upon the cages of these devices are detrimental to the life thereof, particularly in the area of the reduced section adjacent to the enlarged apertures in the cage. It should also be noted that the thrusting axial loads on the contracting spherical surfaces of the inner and outer members tend to give rise to a friction and heating problem and, thus, it is desirable to maintain a large area of contact between the cage and the members to maintain relatively low unit loads.

Therefore an object of this invention is to provide an improved ball type universal joint having a cage; which cage is of strong, light-weight construction capable of withstanding larger loading than those heretofore known.

Another object of this invention is to provide a ball type universal joint which employs a cage and a plurality of drive balls wherein the relationship of the cage to the inner member is such that it permits the cage structure to be materially strengthened.

Yet another object of this invention is to provide an improved cage structure capable of supporting heavy loads when maintaining the drive balls in a common plane.

Still another object of this invention is to provide an inner member of a ball type constant velocity universal joint such that the cage utilized therewith has a structure which is substantially symmetrical and will withstand axial loads while maintaining the drive balls in a common plane particularly when the inner and outer members are disposed in an angular relationship and transmitting torque.

Yet a further object of this invention is to provide a simple one piece cage construction of sufficient strength and rigidity which is inexpensive to manufacture and easily installed in a universal joint assembly.

These and other objects and advantages of this invention will become apparent from the following detailed description when taken in connection with the accompanying drawings wherein:

FIG. 1 is a sectional view of a ball type universal joint embodying this invention taken along line 1—1 of FIG. 2;

FIG. 2 is a sectional view of the ball type universal joint shown in FIG. 1 taken along line 2—2 of FIG. 1;

FIG. 3 is a sectional view of the ball type universal joint shown in FIG. 1 taken along the lines 3—3 of FIG. 1 and with the joint members disposed in an angular relationship;

FIG. 4 is a view of the cage and inner member of the universal joint of FIG. 1-3; the cage being shown in section as it appears in FIG. 2 and the inner member being rotated 90° about its vertical axis and partially inserted into the cage to illustrate the manner in which these parts are assembled;

FIG. 5 is a view similar to FIG. 4 with the inner member inserted further into the cage than as shown in FIG. 4;

FIG. 6 is a view looking in the direction of arrow 6 in FIG. 5, after the inner member has been completely inserted into the cage;

FIG. 7 is a view similar to FIG. 6 looking in the direction of arrow 7 in FIG. 5;

Figure 9:
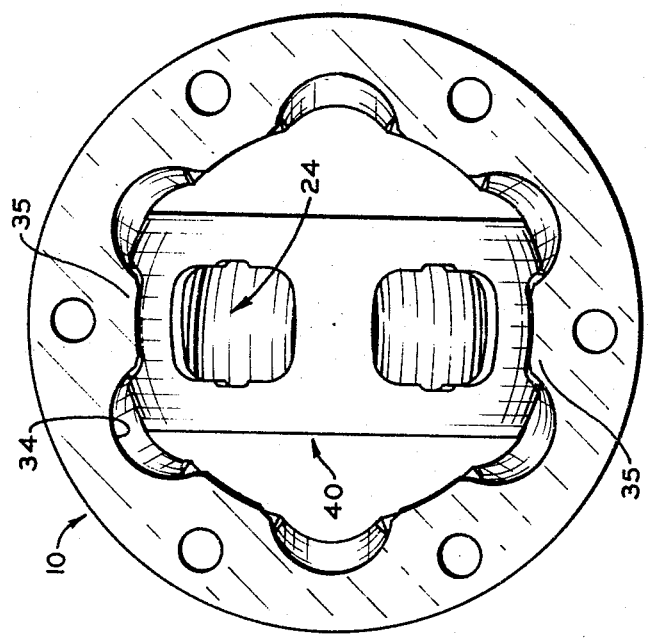
FIG. 9 is an elevational view looking in the direction of arrow 9 in FIG. 8.

In a preferred embodiment of this invention, one of the lobes of the inner member is axially foreshortened and adapted for insertion into one of the elongated apertures or slots of the cage member; the lobes being the portions of the inner member lying circumferentially intermediate the grooves and having spherical peripheral surfaces. The foreshortened lobe allows the length of the elongated slot to be substantially reduced, when compared to the prior art, thus providing a strong cage structure having a more symmetrical configuration.

Referring now to the drawings, particularly FIGS. 1-3, an annular outer member 10 of a ball type constant velocity universal joint shown generally at 12 is adapted to be conventionally drivingly connected to a drive line member (not shown) as by suitable fastening means secured in a plurality of circumferentially spaced apertures 14 formed in the member 10; the drive line member engaging the left face 16 of the member 10 as seen in FIG. 2.

The outer member 10 is provided with an internal spherical surface 18 formed about a center C lying on the longitudinal axis of rotation of the member 10, while the left end face 16 and the right end face 22 thereof are parallel and axially equally spaced from the center C.

An annular inner member 24 is disposed within the outer member 10 and has a spherical external surface 26 formed about the center C, which surface 26 is radially spaced from the internal spherical surface 18. The inner member 24 is formed with radially extending parallel end faces 28 and 30 which are axially equally spaced from the center C and is also formed with a splined central bore 32 for conventional securement to another driveline member (not shown).

The outer member 10 is provided with a plurality of generally axially extending circumferentially spaced grooves 34, which grooves are all generated about a center C' which lies on the axis of rotation of the member 10 and is disposed axially to the right of the center C, as viewed in FIG. 2. Six such grooves 34 have been shown and define intermediate the same six lobes 35; the lobes being that portion of the outer member 10 having the spherical internal surface 18 thereon. The inner member 24 is likewise provided with a plurality of generally axially extending circumferentially spaced grooves 36 generated from a center C''; the center C'' being coaxial with the center C and C' and displaced to the left of the center C as viewed in FIG. 2, an amount equal to the axial displacement of the center C' from the center C. Six such grooves 36 have been shown and define intermediate the same six lobes 37; the lobes 37 being that portion of the inner member 24 having the spherical peripheral surface 26 thereon. Each of the grooves 34 and lobes 35 in the outer member 10 is disposed diametrically opposite to another groove 34 and lobe 35 respectively, which diametrically opposed relationship is also present with respect to the grooves 36 and lobes 37 of the inner member 24. The grooves 34 and 36, while extending axially, are arcuate with respect to the axis of the member containing the same, and the arcuate relationship of the grooves 34 with respect to the longitudinal axis of the joint 12 is opposite to the arcuate relationship of the groove 36 therewith.

The members 10 and 24, when assembled, are arranged so that the grooves 34 and 36 are aligned in a cooperating paired relationship, that is, a groove 34 being cooperatively disposed with each groove 36, and a drive ball 38 is disposed in each pair of grooves such that it is in a torque transferring relationship with the outer and inner members 10 and 24. As seen in FIGS. 1-3, the diameter of the drive balls 38 and the generating radii and cross-sectional areas of the grooves 34 and 36 are selected so that the drive ball will closely fit into grooves 34 and 36 and lie in a plane which passes through the center C of the universal joint 12. It is thus apparent that the grooves 34 and 36 are in a mirror image relationship with respect to each other and it has been found that such a mirror image relationshiup, as well as other well known groove configurations having such a mirror image relationship, will function in a ball type constant velocity universal joint.

Means are provided for retaining the drive balls 38 in a uniplanar relationship. More particularly an annular cage 40 is disposed radially intermediate the outer and inner members 10 and 24 and has spherical external and internal surfaces 42 and 44 generated from the center C and respectively slidingly engaging the spherical internal surface 18 of the outer member and the spherical peripheral surface 26 of the inner member. As viewed in FIG. 2, with the outer and inner members 10 and 24 axially aligned, the cage member 40 is axially coextensive with the outer member 10 and terminates in parallel left and right end faces 46 and 48 respectively. The cage 40 is provided with a plurality of circumferentially spaced, radially extending openings 50, each of which is cooperatively disposed with and receives one of the drive balls 38.

The portions of the cage 40 circumferentially intermediate such openings form transverse walls 51, which walls as seen in FIGS. 1 and 2, engage the spherical surfaces 18 and 26.

As shown in FIG. 2, in the axial direction the openings 50 are closely spaced with respect to the periphery of the drive ball 38 contained therein and, while the drive balls may move radially with respect to the cage 40 as the drive balls move within the grooves 34 and 36, the drive balls are closely limited from moving axially with respect to the cage. Thus, it is seen that the cage 40 maintains the drive balls 38 in the desired uniplanar relationship. However, as is well known with respect to ball type constant velocity universal joints of the general class herein contemplated, as seen in FIG. 3, when angular movement occurs between the inner and outer members 24 and 10, the drive balls 38 must of necessity move circumferentially with respect to each other, that is, the circumferential distance between the drive balls is variable, so that the openings 50 in the cage 40 must be circumferentially elongated. This circumferential elongation of the openings 50 is readily apparent when FIG. 1 is viewed, and, though the drive balls move both radially and circumferentially relative to the cage, they remain in a single plane. The opposed sides of the opening 50 are parallel and do not lie on direct radii formed from the center C but in effect lie on cords of the circle shown by the cross-sectional circular configuration of the cage as viewed in FIG. 1.

As is readily apparent when FIGS. 1-3 are observed, the inner member 24 cannot be directly axially inserted into the cage 40, nor can the cage 40 be directly axially inserted into the outer member 10 because of their closely fitting spherical configurations. Accordingly, it has been found convenient to assemble the inner member 24 into the cage 40 and subsequently assemble this subassembly of the cage and inner member into the outer member 10. In the prior art assembly of an inner member into a cage, it was found convenient to rotate the inner member 90° with respect to the cage so that their longitudinal axes of rotation are disposed at 90° with respect to one another; one of the lobes of the inner member being inserted into one of the elongated openings in the cage such that the inner member can be inserted within the cage, and after the inner member is inserted, it is radially centralized with respect to the cage and then rotated so that its axis of rotation is coaxial with the cage's axis of rotation. This necessitated having an opening in the cage circumferentially elongated sufficiently to accommodate the lobe of the inner member such that the transverse walls of the cage intermediate the elongated opening and the adjacent openings were substantially reduced in circumferential extent to a degree that such was by far the weakest location in the cage.

The present invention contemplates means for reducing the extent to which an opening in the cage is elongated in order to accommodate a lobe of the inner member. More particularly, the lobe 37A of the inner member 24 is axially foreshortened by removing portions from both axial ends thereof an amount which, as seen in FIG. 3, will not interfere with the engagement of the sides of the lobe 37A with the drive ball 38 engaged thereby when the outer and inner members 10 and 24 are disposed at the desired maximum angular relationship; the balance of the lobes 37 of the inner member 24 as seen in FIG. 2, remaining substantially axially coextensive with the cage 40. Thus, the axial left and right end faces 52 and 54 of the lobe 37A are spaced axially inwardly from the end faces 28 and 30 of the inner member 24. However, it is understood that for high speed operation when balancing is critical, it may be desirable to axially foreshorten the lobe 37B opposite the lobe 37A in order to balance the universal joint 10.

Referring to FIGS. 4 and 5, the axially foreshortened lobe 37A is inserted into an opening 50A in the cage 40 so that the inner member 24 may be inserted into the cage 40 in the conventional manner; that is, by inserting the lobe 37A, the lobe 37B clears the cage portion opposite to the opening 50A as the lobe 37B is moved into the cage. The opening 50A and the opening 50B diametrically opposed with respect thereto are circumferentially elongated somewhat more than the balance of the openings 50; however, as is readily apparent from FIGS. 6 and 7, the opening 50A is not elongated to the extent necessary to receive the lobe 37B and the other lobes 37 which are not axially foreshortened (see FIG. 7) while being circumferentially elongated sufficiently to receive the lobe 37A which is axially foreshortened (see FIG. 6). Thus, the transverse walls 51A between the opening 50A and the openings immediately adjacent thereto and between the opening 50B and the openings immediately adjacent thereto are reduced in their circumferential dimension less than they would be if the lobe of the inner member which they would receive, as in the prior art, was not axially foreshortened, so that the cage 40 is strong and rigid, able to withstand great axial loads and is substantially more symmetrical than the cages of the prior art constructed universal joints.

While it has been stated that a lobe 37A can be axially foreshortened as well as the lobe 37B opposite to the same, it is highly detrimental to foreshorten all of the lobes of the inner member 24 since such would greatly reduce the contact area between the spherical surface 26 of the inner member and the spherical surface 44 of the cage 40 and thus greatly increase the unit pressure contact therebetween when the cage is subjected to axial loads by the drive balls 38 as hereinbefore discussed; axial movement of the cage being resisted by the engagement of these spherical contact surfaces.

Figure 8:
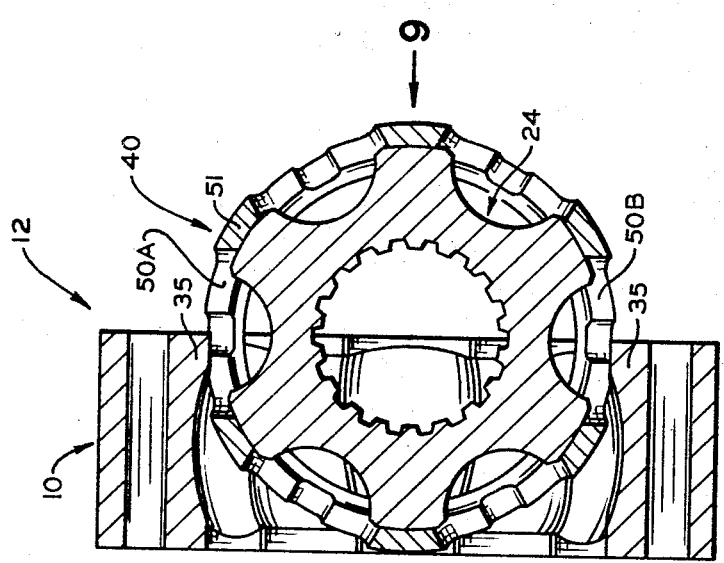
FIG. 8 is a sectional view illustrating the method of inserting the subassembly of the cage and inner member into the outer member.

Referring now to FIGS. 8 and 9, once the inner member 24 has been inserted into the cage 40 and rotated so as to be coaxial therewith, the subassembly of the cage and inner member is rotated so that the axis of rotation thereof is disposed at 90° to the axis of rotation of the outer member 10 and the subassembly is inserted into the outer member 10; during such insertion one of the lobes 35 of the outer member 10 is inserted into one of the elongated openings 50A or 50B in the cage 40 while another lobe 35 of the outer member, diametrically opposed to the one lobe, is inserted into the other elongated opening in the cage 40. When the subassembly of the cage and inner member is disposed concentrically with the outer member 10 the same are rotated until the axis of rotation of all of the members again coincide as seen in FIGS. 1 and 2. When the cage does not spherically engage the outer member, i.e., when the outer member has a cylindrical opening, the subassembly can be directly inserted thereinto.

The drive balls are then inserted into the assembled outer and inner member and cage in a manner well known in the art, that is, the outer and inner members and cage are aligned such that the grooves 34 and 36 and openings 50 are cooperatively positioned, and then the members and cage are angularly displaced with respect to each other so that the drive balls can be inserted one at a time into the aligned grooves 34 and 36 through the exposed opening 50 in the cage.

While a single embodiment of this invention has been shown and described it is readily apparent that many changes can be made therein without departing from the scope of this invention as defined by the following claims.

What is claimed is:

1. A constant velocity universal joint comprising in combination, (a) an outer member having an axially extending opening therein, (b) an inner member received within said opening and radially spaced from said outer member, (c) said outer member having a plurality of axially extending grooves formed in the portion thereof surrounding the opening therein, (d) said inner member having a plurality of grooves formed in the periphery thereof with each of said grooves in said inner member being disposed in a paired mirror image relationship with a groove in said outer member, (e) a plurality of torque transferring means with at least one positioned within each of said pair of grooves for transferring torque between said inner and outer members, (f) an annular cage disposed radially intermediate said members and having a plurality of circumferentially spaced engaging openings extending radially therethrough with each engaging opening receiving one of said torque transferring means in a radially movable relationship and axially engaging the same for constantly positioning said torque transferring means in a uniplanar relationship, (g) said cage and said inner member having spherical internal and peripheral surfaces respectively which surfaces are in a slidable contacting relationship whereby said inner member and cage are angularly movable relative to each other, (h) said cage and said outer member including means for allowing the same to move angularly with respect to each other, (i) the portions of said inner member circumferentially intermediate the grooves therein forming axially elongated lobes, and (j) the axial length of at least one of said lobes being less than the axial length of the other of said lobes and less than the circumferential length of at least one of the receiving openings in said cage, (k) the circumferential length of said one receiving opening being less than the axial length of said other of said lobes, (l) whereby said one lobe is insertable into said one opening for the purpose of assembling said inner member into said cage.

2. A constant velocity universal joint according to claim 1 wherein the circumferential length of at least said one receiving opening is greater than the circumferential length of the other of said receiving openings.

3. A constant velocity universal joint according to claim 1 wherein said plurality of grooves in each said inner and outer member are of an even number with each groove in each of said members having another groove in said member diametrically opposed with respect thereto whereby an even number of lobes are formed on said inner member and said cage has an even number of diametrically opposed engaging openings therein, and said engaging opening diametrically opposed to said one opening being substantially equal in circumferential length to said one opening.

4. A constant velocity universal joint according to claim 1 wherein said means for allowing said cage and said outer member to move angularly with respect to each other is characterized by said cage and said outer member having spherical external and internal surfaces respectively which surfaces are in a slidable contacting relationship.

5. A constant velocity universal joint according to claim 4 wherein said internal and external spherical surfaces on said cage, the spherical external surface on said inner member and the spherical internal surface in said outer member are generated from concentric centers.

6. A constant velocity universal joint according to claim 5 wherein the grooves in said inner and outer members extend axially straight and are formed arcuately with respect to the axis of revolution of the member containing the same.

7. A constant velocity universal joint according to claim 6 wherein the generating center for each of said grooves is displaced from the generating center of said spherical surfaces.

8. A constant velocity universal joint according to claim 2 wherein said plurality of grooves in each said inner and said outer member are of an even number with each groove in each of said members having another groove in said member diametrically opposed with respect thereto whereby an even number of lobes are formed on said inner member in a diametrically opposed relationship and said cage has an even number of diametrically opposed engaging openings therein, and said engaging opening diametrically opposed to said one opening being substantially equal in circumferential length to said one opening.

9. A constant velocity universal joint according to claim 8 wherein said means for allowing said cage and said outer member to move angularly with respect to each other is characterized by said cage and said outer member having spherical external and internal surfaces respectively which surfaces are in a slidable connecting relationship.

10. A constant velocity universal joint according to claim 9 wherein the internal and external spherical surfaces on said cage, the spherical external surface on said inner member and the spherical internal surface in said outer member are generated from concentric centers.

11. A constant velocity universal joint according to claim 8 wherein the grooves in said inner and outer members extend axially straight are formed arcuately with respect to the axis of revolution of the member containing the same.

12. A constant velocity universal joint according to claim 11 wherein the internal and external spherical surfaces on said cage, the spherical external surface on said inner member and the spherical internal surface in said outer member are generated from concentric centers, and the generating center for each of said grooves is displaced from the generating center of said spherical surfaces.

13. A constant velocity universal joint according to claim 12 wherein the generating centers for said plurality of grooves in said inner member are concentric and displaced in a first axial direction with respect to the generating center of said spherical surfaces and the generating centers for the grooves in said outer member are concentric and disposed in the opposite axial direction from the generating center for said spherical surfaces with respect to the generating center for the grooves in said inner member.

References Cited
UNITED STATES PATENTS

| | | | |
|---|---|---|---|
| 1,665,280 | 4/1928 | Rzeppa | 64—21 |
| 1,916,422 | 7/1933 | Rzeppa | 64—21 |
| 1,975,758 | 10/1934 | Stuber | 64—21 |
| 3,162,026 | 12/1964 | Ritsema | 64—21 |

FRED C. MATTERN, Jr., *Primary Examiner.*

H. C. COE, *Assistant Examiner.*